United States Patent
Rawat et al.

(10) Patent No.: US 11,532,057 B1
(45) Date of Patent: Dec. 20, 2022

(54) AUTOMATIC UPDATING OF REAL ESTATE DATABASE

(71) Applicant: Trulia, LLC, Seattle, WA (US)

(72) Inventors: Shourabh Rawat, Mountain View, CA (US); Jeff McConathy, San Francisco, CA (US); Todd Holloway, San Francisco, CA (US); Sriram Gopalakrishnan, Berkeley, CA (US); Abhinav Kulkarni, San Francisco, CA (US)

(73) Assignee: Zillow, Inc., Seattle, WA (US)

( * ) Notice: Subject to any disclaimer, the term of this patent is extended or adjusted under 35 U.S.C. 154(b) by 369 days.

(21) Appl. No.: 16/588,622

(22) Filed: Sep. 30, 2019

Related U.S. Application Data

(63) Continuation of application No. 14/325,078, filed on Jul. 7, 2014, now Pat. No. 10,430,902.

(51) Int. Cl.
*G06Q 50/16* (2012.01)
*G06F 16/58* (2019.01)

(52) U.S. Cl.
CPC ......... *G06Q 50/16* (2013.01); *G06F 16/5866* (2019.01)

(58) Field of Classification Search
None
See application file for complete search history.

(56) References Cited

U.S. PATENT DOCUMENTS

| | | | |
|---|---|---|---|
| 8,108,271 B1 | 1/2012 | Dunca | |
| 8,255,418 B2 | 8/2012 | Fuhry | |
| 8,595,186 B1 | 11/2013 | Mandyam | |
| 8,922,481 B1 * | 12/2014 | Kauffmann | H04M 1/7243 345/156 |
| 9,361,583 B1 | 6/2016 | Holloway | |
| 9,990,639 B1 | 6/2018 | Kong | |
| 10,078,679 B1 | 9/2018 | Shefferman | |
| 10,430,902 B1 | 10/2019 | Rawat | |
| 2003/0187759 A1 | 10/2003 | Arthus | |
| 2004/0138912 A1 | 7/2004 | Campbell | |
| 2004/0193952 A1 | 9/2004 | Narayanan | |
| 2005/0192930 A1 | 9/2005 | Hightower | |
| 2005/0289196 A1 | 12/2005 | Starbuck | |
| 2006/0212416 A1 | 9/2006 | Taylor | |
| 2006/0247944 A1 | 11/2006 | Calusinski, Jr. | |
| 2007/0133947 A1 * | 6/2007 | Armitage | G06F 16/7328 386/224 |
| 2008/0172393 A1 | 7/2008 | Baird | |
| 2008/0244008 A1 | 10/2008 | Wilkinson | |
| 2009/0006490 A1 | 1/2009 | Hunt et al. | |
| 2009/0187575 A1 | 7/2009 | DaCosta | |
| 2009/0307050 A1 | 12/2009 | Fournier | |

(Continued)

OTHER PUBLICATIONS

"Clever Uses for Reverse Image Search", Thorin Klosowski, lifehacker.com (Year: 2013).*

(Continued)

*Primary Examiner* — Dennis W Ruhl

(74) *Attorney, Agent, or Firm* — Perkins Coie LLP

(57) ABSTRACT

A system for updating a database comprises an input interface and a processor. The input interface is configured to receive image data. The processor is configured to determine from the image data one or more attributes of a database entry for real estate property and update the database entry for the real estate property.

17 Claims, 10 Drawing Sheets

(56) References Cited

U.S. PATENT DOCUMENTS

| | | | |
|---|---|---|---|
| 2011/0071924 A1 | 3/2011 | Desmond | |
| 2011/0107301 A1 | 5/2011 | Chan | |
| 2012/0311431 A1* | 12/2012 | Breaker | G06Q 50/16 715/234 |
| 2013/0041949 A1 | 2/2013 | Biesecker | |
| 2016/0027051 A1 | 1/2016 | Gross | |
| 2016/0132946 A1 | 5/2016 | Bate | |

OTHER PUBLICATIONS

Akata, et al., "Good Practice in Large-Scale Learning for Image Classification." Retrieved from the internet on Jun. 3, 2015 <http://hal.inria.fr/docs/00/83/58/10/PDF/TPAMI_minor_revision.pdf> 15 pages.

Crammer et al., "Online Passive-Aggressive Algorithms." Retrieved from the internet on Jun. 3, 2015 <http://jmlr.org/papers/volume7/crammer06a/crammer06a.pdf> 35 pages.

Cuda-convnet. High-performance C++/CUDA implementation of convolutional neural networks. Retrieved from the internet on Jun. 3, 2015 <https://code.google.com/p/cuda-convnet/> 3 pages.

Cuzzocrea, A. et al., "A multi-view multi-dimensional ensemble learning approach to mining business process deviances." 2016 International Joint Conference on Neural Networks (IJCNN) Year: 2016 pp. 3809-3816.

Final Office Action in U.S. Appl. No. 13/245,584, dated Apr. 10, 2017, 27 pages.

Final Office Action in U.S. Appl. No. 13/245,584, dated Feb. 6, 2015, 26 pages.

Final Office Action in U.S. Appl. No. 13/245,584, dated Jul. 9, 2013, 23 pages.

FLANN-Fast Library for Approximate Nearest Neighbors. Retrieved from the internet on Jun. 3, 2015 <http://www.cs.ubc.ca/research/flann/> 2 pages.

Garcia, N., et al., "ANN+GIS: An automated system for property valuation", Neurocomputing, vol. 71, 2008, pp. 733-742.

Girshick, et al., "Rich feature hierarchies for accurate object detection and semantic segmentation." Retrieved from the internet on Jun. 3, 2015 <http://www.cs.berkeley.edu/~rbg/papers/r-cnn-cvpr.pdf> pp. 1-21.

GitHub, BVLC/Caffe. Retrieved from the internet on Jun. 3, 2015 <https://github.com/BVLC/caffe/blob/master/LICENSE> 1 page.

Gong, R., et al., "A Kolmogorov-Smirnov statistic based segmentation approach to learning from imbalanced datasets: With application in property refinance prediction", Expert Systems with Applications: An International Journal, vol. 39, Issue 6, May 2012, pp. 6192-6200.

Huang, S., et al., "Topological pattern discovery and feature extraction for fraudulent financial reporting", Expert Systems with Applications: An International Journal , vol. 41, Issue 9, Jul. 2014, pp. 4360-4372.

Huang, S.Y et al., "The prediction approach with Growing Hierarchical Self-Organizing Map." 2012 International Joint Conference on Neural Networks (IJCNN) Year: 2012 pp. 1-7.

Hur, J., et al., "A hybrid classification method using error pattern modeling", Expert Systems with Applications, vol. 34, 2008, pags 231-241.

ImageNet. Retrieved from the internet on Jun. 3, 2015 <http://www.image-net.org/> 1 page.

Jia, Yangqing, et al. "Caffe: Convolutional architecture for fast feature embedding." *Proceedings of the ACM International Conference on Multimedia*. ACM, 2014, 4 pages.

Lazebnik, et al., "Beyond Bags of Features: Spatial Pyramid Matching for Recognizing Natural Scene Categories." Retrieved from the internet on Jun. 3, 2015 <http://www-cvr.ai.uiuc.edu/ponce_grp/publication/paper/cvpr06b.pdf> 8 pages.

Lowe, et al., "Distinctive Image Features from Scale-Invariant Keypoints," International Journal of Computer Vision, 60(2), 2004, pp. 91-110.

Non-Final Office Action in U.S. Appl. No. 13/245,584, dated Jul. 18, 2016, 26 pages.

Non-Final Office Action in U.S. Appl. No. 13/245,584, dated Jul. 8, 2014, 20 pages.

Non-Final Office Action in U.S. Appl. No. 13/245,584, dated Nov. 27, 2012, 22 pages.

Non-Final Office Action in U.S. Appl. No. 13/245,584, dated Nov. 5, 2015, 26 pages.

Non-Final Office Action in U.S. Appl. No. 13/245,584, dated Oct. 5, 2017, 27 pages.

Non-Final Office Action in U.S. Appl. No. 14/325,078, dated Mar. 6, 2017, 14 pages.

Non-Final Office Action in U.S. Appl. No. 16/102,333, dated Sep. 11, 2019, 21 pages.

Non-Final Office Action in U.S. Appl. No. 14/558,390, dated Jan. 3, 2017, 17 pages.

Notice of Allowance in U.S. Appl. No. 14/558,390, dated Dec. 6, 2017, 6 pages.

Notice of Allowance in U.S. Appl. No. 14/558,390, dated Feb. 28, 2018, 6 pages.

Notice of Allowance in U.S. Appl. No. 13/245,584, dated Jun. 4, 2018, 8 pages.

Notice of Allowance in U.S. Appl. No. 14/325,078, dated May 20, 2019, 11 pages.

Ojala, et al., "Multiresolution Gray-Scale and Rotation Invariant Texture Classification with Local Binary Patterns." Retrieved from the internet on Jun. 3, 2015 <http://www.outex.oulu.fi/publications/pami_02_opm.pdf>, pp. 1-35.

Opencv. Retrieved from the internet on Jun. 3, 2015 <http://opencv.org/> 3 pages.

Perronnin, et al., "Improving the Fisher Kernel for Large-Scale Classification." Retrieved from the internet on Jun. 3, 2015 <https://lear.inrialpes.fr/pubs/2010/PSM10/PSM10_0766.pdf> 14 pages.

Prasad, C. et al., "Prediction of authorship using various classification algorithms." 2017 International Conference on Advances in Computing, Communications and Informatics (ICACCI) Year: 2017 pp. 1671-1676.

Python. Pyleargist 1.0.1. Retrieved from the internet on Jun. 3, 2015 <https://pypi.python.org/pypi/pyleargist/1.0.1> 2 pages.

Scikit-image. Image processing in python. Retrieved from the internet on Jun. 3, 2015 <http://scikit-image.org> 2 pages.

Scikit-learn. Machine Learning in Python. Retrieved from the internet on Jun. 3, 2015 <http://scikit-learn.org/stable/> 3 pages.

Siagian, et al., "Rapid Biologically-Inspired Scene Classification Using Features Shared with Visual Attention." IEEE Transactions on Pattern Analysis and Machine Intelligence, Feb. 2007, pp. 1-19.

Theano. Retrieved from the internet on Jun. 3, 2015 <http://deeplearning.net/software/theano/> 3 pages.

Tola, et al., "DAISY: An Efficient Dense Descriptor Applied to Wide Baseline Stereo," Ecole Polytechnique Federale de Lausanne, Jun. 14, 2009, pp. 1-31.

Van de Sande et al., "Evaluation of Color Descriptors for Object and Scene Recognition." Retrieved from the internet on Jun. 3, 2015 <https://staff.fnwi.uva.nl/k.e.a.vandesande/pub/vandesande-cvpr2008.pdf> 8 pages.

Vanhoenshoven, F. et al., "Detecting malicious URLs using machine learning techniques." 2016 IEEE Symposium Series on Computational Intelligence (SSCI) Year: 2016 pp. 1-8.

Zhou, et al., "Image Classification using Super-Vector Coding of Local Image Descriptors." Retrieved from the internet on Jun. 3, 2015 <http://stat.rutgers.edu/home/tzhang/papers/eccv10_supervect.pdf>, pp. 1-14.

U.S. Appl. No. 16/102,333 for Shefferman, filed Aug. 13, 2018.

Final Office Action in U.S. Appl. No. 16/102,333, dated Apr. 10, 2020, 4 pages.

Notice of Allowance in U.S. Appl. No. 16/102,333, dated Aug. 10, 2020, 7 pages.

* cited by examiner

Real Estate Property Site

Attributes 3 bedrooms
2 bathrooms
kitchen
living room
garage
patio
pool

This is a charming 3 bedroom 2 bathroom home with a patio and a pool in the best neighborhood in town.

200

Real Estate Attributes

3 Bedrooms ✓

2 Bathrooms ✓

Kitchen ✓

Living Room ✓

Hot Tub

Deck ⌶

Paved Driveway ✓

2 Floor Building

Real Estate Property Search

Number Of Bedrooms: 3

Number Of Bathrooms: 2

Kitchen

White Cabinets

Select Attribute

Search

Kitchens With White Cabinets

— 602

— 604

— 606

— 608

AUTOMATIC UPDATING OF REAL ESTATE DATABASE

CROSS-REFERENCE TO RELATED APPLICATION(S)

This application is a continuation of U.S. patent application Ser. No. 14/325,078 (U.S. Pat. No. 10,430,902) entitled "AUTOMATIC UPDATING OF REAL ESTATE DATABASE," filed on Jul. 7, 2014, the disclosure of which is incorporated herein by reference in its entirety.

BACKGROUND

A real estate agent website stores information describing real estate properties in a real estate database. Information describing real estate properties comprises text descriptions, property attributes, property images, and any other appropriate information. However, sometimes there are errors omissions in the information that is in the database.

BRIEF DESCRIPTION OF THE DRAWINGS

Various embodiments of the invention are disclosed in the following detailed description and the accompanying drawings.

FIG. 3 is a diagram illustrating an embodiment of real estate attributes.

FIG. 5 is a diagram illustrating an embodiment of a real estate property search window.

DETAILED DESCRIPTION

Figure 1:
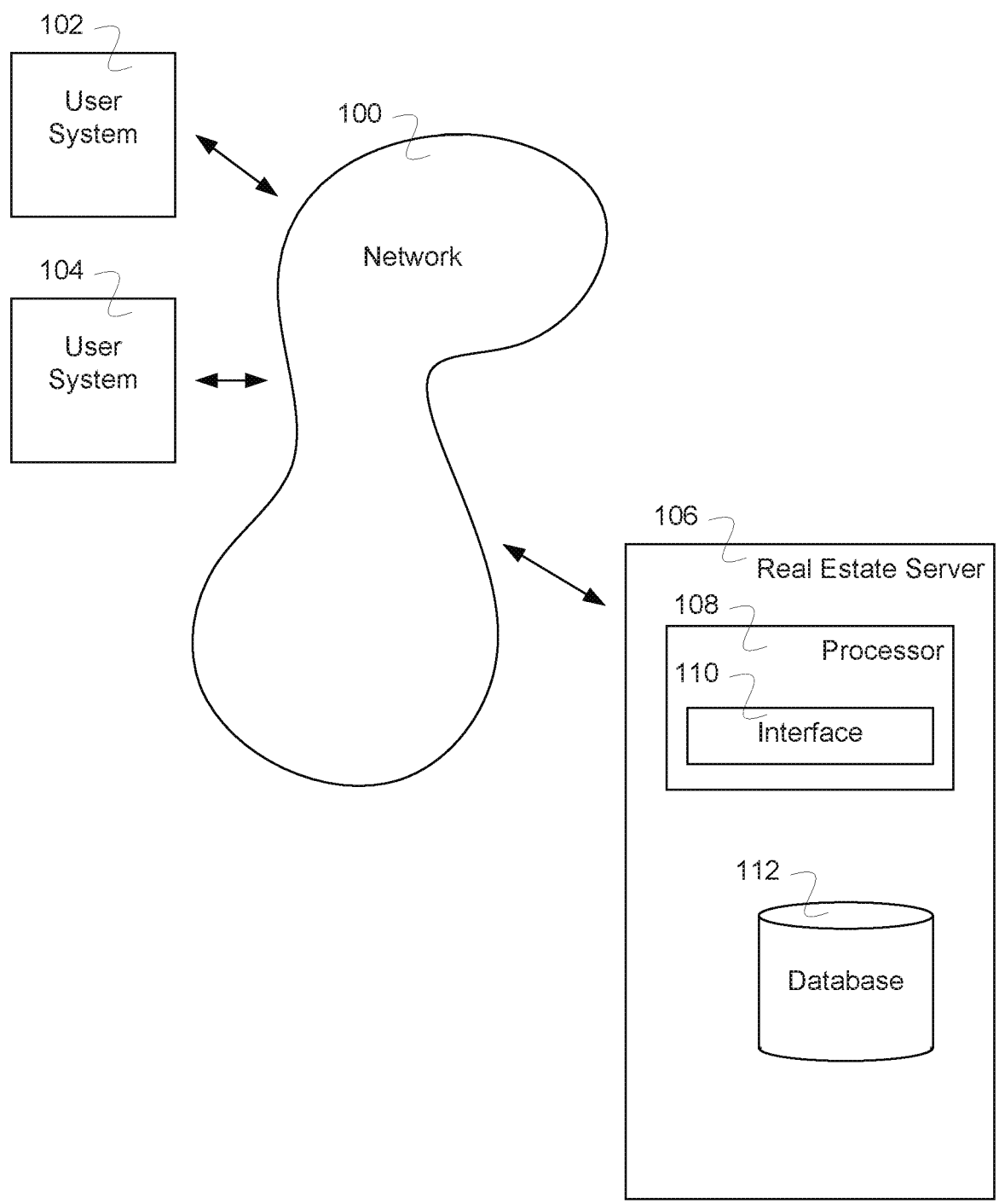
FIG. 1 is a block diagram illustrating an embodiment of a network system for automatic updating of a real estate database.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automatic updating of real estate database is disclosed. A system for updating a real estate database comprises an input interface configured to receive image data, and a processor configured to determine from the image data and/or other property attributes, one or more attributes of a database entry for a real estate property and update the database entry for the real estate property. The system for updating a real estate database further comprises a memory coupled to the processor and configured to provide the processor with instructions.

In some embodiments, a system for automatic tagging of real estate images receives real estate images associated with a real estate property and determines image tags associated with the real estate images. In various embodiments, image tags describe neighborhood attributes, room type attributes, house type attributes, view type attributes, room attributes, objects in a room such as furniture, chandeliers, property tree count, home square footage, number of floors, type of flooring, presence of a deck, presence of a hot tub, presence of a dock to a lake, presence of a pool, driveway material, property slope, presence of a fireplace, presence of a wine cellar, number of bathrooms, number of bedrooms, or any other appropriate attributes.

In some embodiments, real estate property images are stored in a real estate database along with real estate property attributes and a real estate property description. Image tags associated with the real estate property images are added to the real estate database. In some embodiments, if an image tag and a real estate property attribute comprise associated information (e.g., a real estate property attribute indicating a hot tub and an image tag indicating a picture of a hot tub), the image tag corroborates the real estate property attribute (e.g., indicates confirmation that the real estate property attribute is correct). In some embodiments, image tags are used to add attributes to the real estate database (e.g., if an image tag indicates a hot tub but no property attribute indicates a hot tub, a hot tub property attribute is added). In some embodiments, image tags are used to flag attributes for review (e.g., if a hot tub property attribute is present but no hot tub image tag is found, the hot tub property attribute is flagged for review). In some embodiments, image tags are used to delete attributes (e.g., if a garage property attribute is present and an exterior view image comprises a no garage image tag—for example, it clearly shows no garage present—the garage property attribute is deleted). Image tag information is searchable in combination with property attribute information (e.g., a real estate site user can search for three bedroom and two bathroom homes with brown walls, or with kitchens with white cabinets). Image search results can additionally be used to create publicly viewable static pages with interesting images (e.g., with images of large kitchens, with images of rooms including both a hot tub and a bar, with images of pools on roofs, etc.) for attracting users to the real estate site via Internet searches. In some embodiments, the image tags are used to identify other real estate properties with visually similar images. In some embodiments, the image tags are used to identify fraudulent listings that replicate images or modified form of images from other valid listings. In some embodiments, the image tags re used to reorder, group, or otherwise organize images when presenting real estate properties to a user. In some embodiments, the image tags are used to rank real estate properties when presenting them to a user. In some embodiments, the image tags are used to link images and objects in the images to ads, products, and/or service providers.

FIG. 1 is a block diagram illustrating an embodiment of a network system for automatic updating of a real estate database. In the example shown, network 100 enables user system 102 and user system 104 to communicate with real estate server 106. In various embodiments, network 100 comprises one or more of the following: a local area network, a wide area network, a wired network, a wireless network, the Internet, an intranet, a storage area network, or any other appropriate communication network. User system 102 and user system 104 comprise user systems (e.g., computing systems for operation by users, e.g., desktop computers, laptop computers, tablet computers, smartphones, wearable computers, etc.). In some embodiments, one or more of user system 102 and user system 104 comprises a system accessed by a user directly (e.g., the user is in proximity with the user system). In some embodiments, one or more of user system 102 and user system 104 comprises a system accessed by a user remotely (e.g., the user is not in proximity with the user system, and accesses the user system via network 100 and a separate user system). In some embodiments, one or more of user system 102 and user system 104 comprise customer systems (e.g., customer systems used by real estate customers). In some embodiments, one or more of user system 102 and user system 104 comprise agent systems (e.g., agent systems used by real estate agents). User system 102 and user system 104 comprise systems accessing real estate server 106 (e.g., accessing real estate server 106 via network 100). In various embodiments, there are 2, 5, 22, 122, 4320, 26100, 136500, or any other appropriate number of user systems accessing real estate server 106.

In some embodiments, real estate information (e.g., listings) is received from other listing providers. In various embodiments, listings are received from real estate agents, real estate brokers, aggregators (e.g., ListHub), or any other appropriate source for listings.

Real estate server 106 includes processor 108, interface 110, and database 112. Processor 108 is able to analyze input images to automatically determine tags. The tags can be added as attributes to real estate properties associated with the input images. The attributes can be stored associated with a real estate property in database 112. In various embodiments, a customer or a real estate agent utilizes a user system (e.g., user system 102 or user system 104) to upload real estate information to real estate server 106, to upload images to real estate server 106, to perform searches on real estate server 106, to view property listings on real estate server 106, or for any other appropriate purpose. In various embodiments, real estate server 106 comprises a server for providing real estate listings, a server for providing a real estate listings website, a server for providing real estate listing recommendations, a server for assisting a real estate agent sell real estate, a server for connecting a real estate customer and a real estate agent, a server for determining image tags, or a server for any other appropriate purpose. In various embodiments, real estate server 106 comprises a computer, a computer with multiple processors, multiple computers connected via a local network, multiple computers connected via a wide area network, multiple computers connected via the Internet, multiple computers connected via network 100, or any other appropriate computing system or systems. In various embodiments, the processors comprising user system 102, user system 104, and real estate listings system 106 comprise any one of a variety of proprietary or commercially available single or multi-processor systems (e.g., an Intel TM-based processor) or other type of commercially available processor able to support communications in accordance with each particular embodiment and application.

Figure 2:
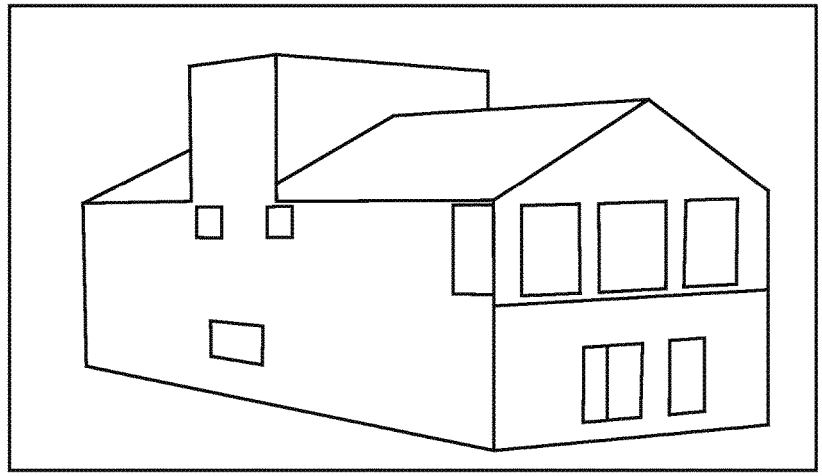
FIG. 2 is a diagram illustrating an embodiment of a real estate property view page on a real estate website.
Figure 2:
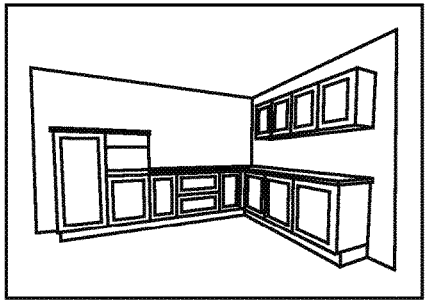
Figure 2:
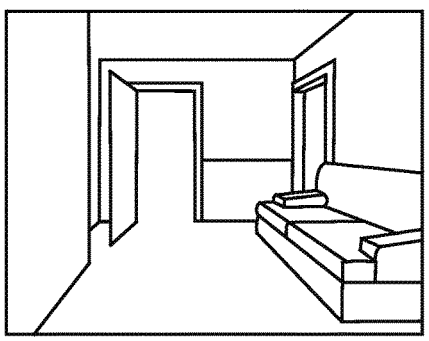

FIG. 2 is a diagram illustrating an embodiment of a real estate property view page on a real estate website. In some embodiments, real estate property view page 200 is stored on and provided by a real estate server (e.g., real estate server 106 of FIG. 1) for view by a real estate customer or agent. In some embodiments, the information of real estate property view page 200 comprises information provided by a real estate customer (e.g., a real estate customer interested in selling a house). In some embodiments, the information of real estate property view page 200 comprises information provided by a real estate agent. In some embodiments, the information is acquired through $3^{rd}$ party provider of real estate data (e.g., real estate agents, real estate brokers, aggregators, etc.). In the example shown, real estate property view page 200 comprises real estate images (e.g., an exterior image, a kitchen image, a living room image, etc.), real estate attributes (e.g., a list of attributes: number of bedrooms, number of bathrooms, kitchen, living room, garage, patio, pool, etc.), and a real estate description (e.g., this is a charming 3 bedroom 2 bathroom home with a patio and a pool in the best neighborhood in town). Real estate images comprise any appropriate number of images of the real estate property (e.g., external images, internal images, kitchen images, living room images, bedroom images, pool images, patio images, view images, etc.). Real estate attributes comprise specifications or keywords describing the real estate property. In various embodiments, real estate attributes comprise number of bedrooms, number of bathrooms, total number of rooms, home square footage, presence of a pool, presence of a hot tub, presence of a garage, number of floors, presence of a deck, presence of a dock to a lake, driveway material, property slope, presence of a fireplace, presence of a wine cellar, neighborhood attributes, room type attributes, house type attributes, view type attributes, architectural elements, room attributes, objects in a room, or any other appropriate attributes. In various embodiments, a room type attribute comprises kitchen, bathroom, living room, bedroom, family room, office, man cave, sunroom, game room, or any other appropriate room type attribute. In various embodiments, a house type attribute comprises colonial, Victorian, ranch, raised ranch, Cape Cod, condominium, cabin, flat, Tudor, shotgun, Mediterranean, modern, or any other appropriate house type attribute. In various embodiments, a view type attribute comprises exterior, interior, front, back, side, street, or any other appropriate view type attribute. In various embodiments, architectural elements comprise walls that are painted, walls that are wall papered, presence of wainscoting, presence of crown molding, or any other appropriate architectural element. In various embodiments, a room attribute comprises wall color, ceiling color, floor type, fireplace, cabinet color, built-ins, or any other appropriate room type attribute. In various embodiments, objects in a room comprise furniture, chandeliers, décor, paintings, or any other appropriate object. In some embodiments, real estate images comprise image tags (e.g., keywords indicating image content). In some embodiments, image tags comprise automatically determined image tags (e.g., image tags that were automatically determined by the real estate server). In some embodiments, an automatically determined image tag is confirmed (e.g., a user is displayed the image and the automatically determined image tag and asked to confirm the tag is correct). In some embodiments, one or more real estate attributes comprise attributes corroborated by image tags. In some embodiments, one or more real estate attributes comprise attributes determined by image tags. In some embodiments, real estate images are displayed on real estate property view page 200 in an order determined by a real estate image uploader. In some embodiments, real estate images are displayed on real estate property view page 200 in an order determined by the real estate server. In some embodiments, real estate images are displayed on real estate property view page 200 in an order based at least in part on real estate attributes. In some embodiments, real estate images are displayed on real estate property view page 200 in an order based at least in part on image tags.

FIG. 3 is a diagram illustrating an embodiment of real estate attributes. In some embodiments, real estate attributes window 300 comprises the real estate attributes window of FIG. 2. In some embodiments, one or more real estate attributes of real estate attributes window 300 comprise corroborated attributes (e.g., attributes entered manually by a real estate customer or agent and corroborated by an automatically determined image tag). In some embodiments, corroborated attributes are indicated by a check mark graphic next to the attribute. In some embodiments, one or more real estate attributes of real estate attributes window 300 comprise uncorroborated attributes (e.g., attributes entered manually by a real estate customer or agent but not corroborated by an automatically determined image tag). In some embodiments, one or more real estate attributes of real estate attributes window 300 comprise image-determined attributes (e.g., attributes determined by an automatically determined image tag but not corroborated by an attribute entered manually by a real estate customer or agent). In some embodiments, image-determined attributes are indicated by a capital I mark next to the attribute. In some embodiments, an image-determined attribute can be converted to a corroborated attribute by the real estate information provider (e.g., the real estate customer or agent providing the information for the real estate property view page) corroborating the image-determined attribute (e.g., indicating that the image-determined attribute is correct). In some embodiments, the real estate information provider can delete an image-determined attribute (e.g., indicating that the image-determined attribute is not correct). In some embodiments, the capital I mark indicating an image-determined attribute is displayed to the real estate information provider (e.g., to indicate that the attribute should be corroborated or deleted) but not to other users of the real estate property view.

Figure 4:
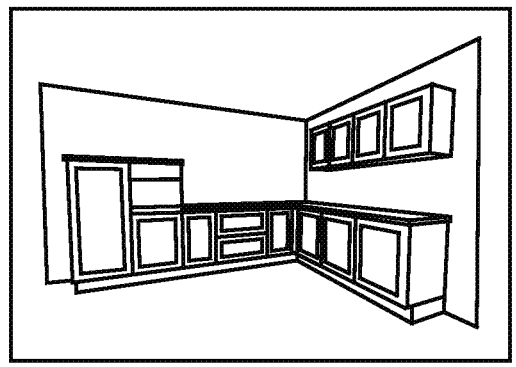
FIG. 4 is a diagram illustrating an embodiment of an image tag confirmation screen.

FIG. 4 is a diagram illustrating an embodiment of an image tag confirmation screen. In some embodiments, image tag confirmation screen 400 is provided to a real estate property view page user in the process of viewing a real estate property view page. In some embodiments, a real estate server provides an image tag confirmation screen interrupting the presentation of a real estate property view page (e.g., the real estate server provides the image tag confirmation screen in response to a request for a real estate property view page, and provides the real estate property view page after the image tag confirmation screen is dismissed). In some embodiments, a real estate server provides an image tag confirmation screen as part of a real estate property view page (e.g., in parallel with the information of the real estate property view page such that a user can respond to it as desired). An image tag confirmation screen comprises an image and one or more tags, and a user interface allowing a user to indicate whether the tags correctly describe the image. In the example shown, image tag confirmation screen 400 comprises an image of a kitchen along with the tags "kitchen" and "white cabinets," and an interface for indicating whether the tags are correct. In some embodiments, information provided to the image tag confirmation screen is provided to the real estate server for training an image tagging algorithm.

In some embodiments, the system indicates to a user (e.g., a real estate agent) that an image associated with a real estate property has been tagged via email. In some embodiments, a real estate agent reviews tags after receiving the email notification.

FIG. 5 is a diagram illustrating an embodiment of a real estate property search window. In some embodiments, a real estate customer or a real estate agent utilizes real estate property search window 500 to search a real estate database for real estate property information. Real estate property search window 500 comprises a user interface for entering a real estate property search. In the example shown, real estate property search window 500 comprises fields for entering property data (e.g., number of bedrooms, number of bathrooms, square footage range, price range, zip code, etc.). Real estate property search window 500 additionally comprises attribute selectors. In some embodiments, attribute selectors comprise menu selectors for selecting property attributes from the set of all property attributes. In some embodiments, the real estate property search comprises a search for a specific attribute. In various embodiments, real estate properties are searched by location attributes, room type attributes, room attributes, house type attributes, or any other appropriate attributes. In some embodiments, when a property attribute is selected using a property attribute selector, the user interface of real estate property search window 500 creates a new property attribute selector for selecting an additional property attribute if desired. Real estate property search window 500 additionally comprises a search button for executing a real estate property search according to the entered property data and property attributes. In some embodiments, a search is performed using a free form text query (e.g., as entered in a search field text entry box). In some embodiments, a search is performed within a real estate property description. In some embodiments, properties identified using a search are displayed based on the current location of a user, where the current location is determined using geolocation services available on the user's phone or tablet.

Figure 6:
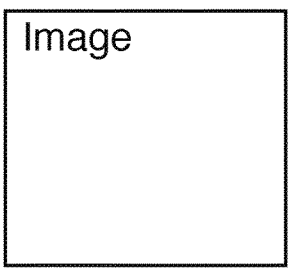
FIG. 6 is a diagram illustrating an embodiment of an image page.
Figure 6:
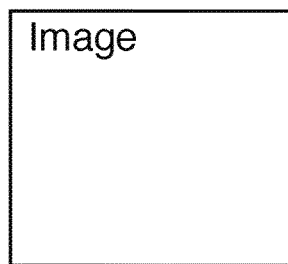
Figure 6:
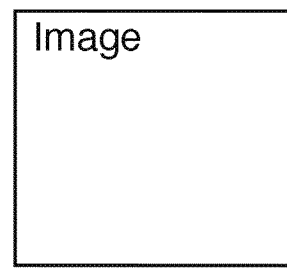
Figure 6:
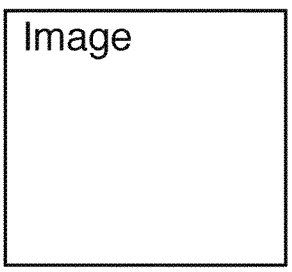
Figure 6:
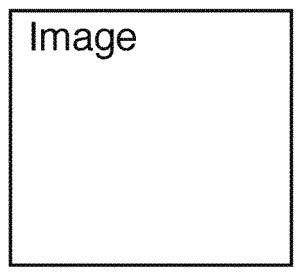
Figure 6:
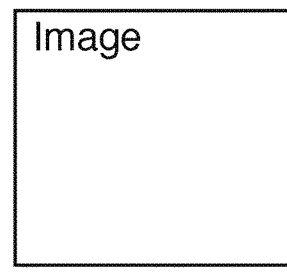
Figure 6:
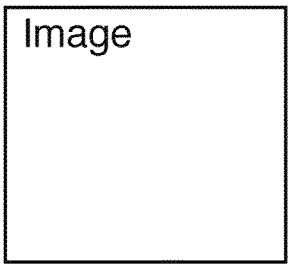
Figure 6:
Figure 6:
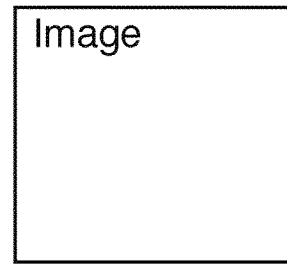
Figure 6:
Figure 6:
Figure 6:
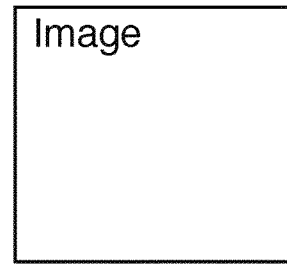

FIG. 6 is a diagram illustrating an embodiment of an image page. In some embodiments, image page 600 is created automatically using a real estate image search. In the example shown, image page 600 comprises a set of images (e.g., image 602, image 604, image 606, image 608, etc.) found by searching an image database for a set of attributes (e.g., kitchens and white cabinets). In some embodiments, each image shown comprises an image from a different property. In some embodiments, some images shown comprise images from the same property. In some embodiments, image page 600 comprises a static page (e.g., a hypertext markup language (HTML) web page) that is publicly viewable. In some embodiments, a set of image pages is created by a real estate server, each image page of the set of image pages using a different set of attributes. In some embodiments, image page 600 additionally comprises the text attributes used to create the page. In some embodiments, image page 600 is designed to be indexed by a search engine. In some embodiments, a set of pages is created automatically or updated automatically based on a set of page criteria (e.g., kitchen+white cabinets, SF+fireplace with mantel, etc.).

In some embodiments, a user is enabled to further filter or refine the set of images by specifying more attributes. In some embodiments, a user also is enabled to provide feedback as to whether an image in the set of images is relevant or not.

Figure 7:
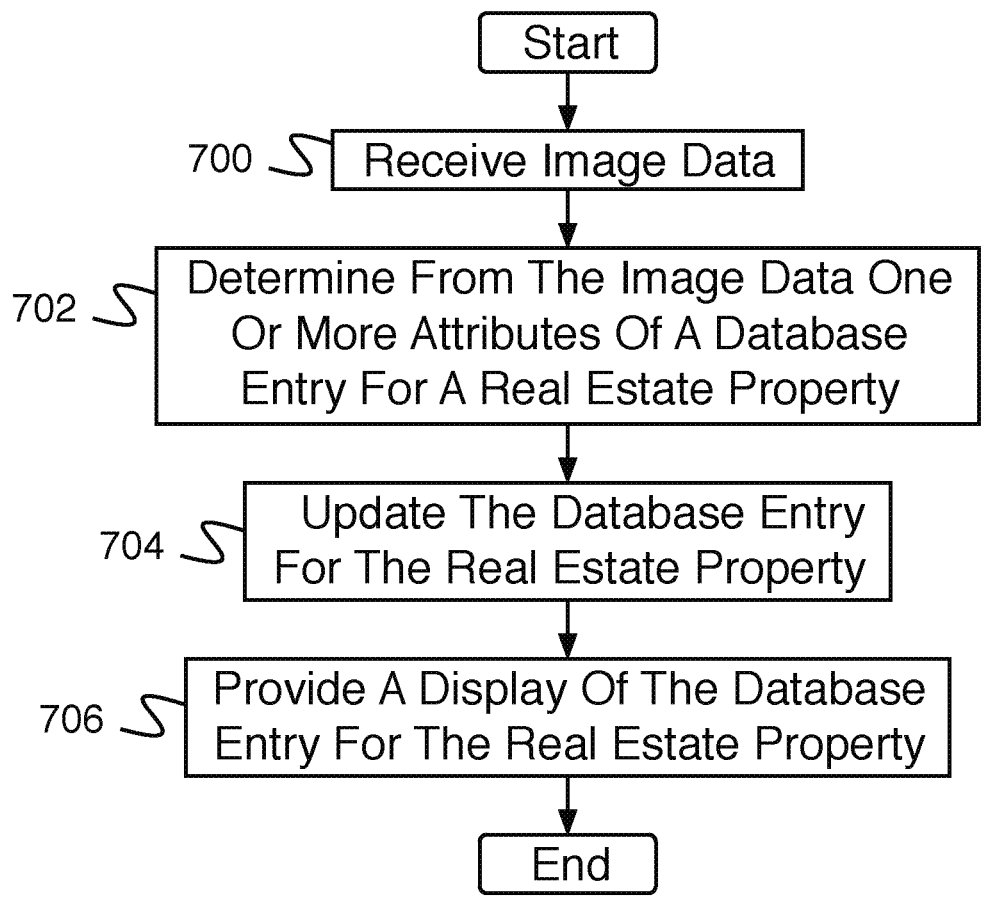
FIG. 7 is a flow diagram illustrating an embodiment of a process for updating a database.

FIG. 7 is a flow diagram illustrating an embodiment of a process for updating a database. In some embodiments, the process of FIG. 7 is executed by a real estate server (e.g., real estate server 106 of FIG. 1). In the example shown, in 700, image data is received. In various embodiments, image data is received from a real estate customer, a real estate agent, a 3$^{rd}$ party listing provider, or any other appropriate real estate system user. In some embodiments, image data is associated with a real estate property. In some embodiments, image data comprises three-dimensional image data (e.g., interior three-dimensional data or exterior three-dimensional data). In some embodiments, three-dimensional image data comprises light detection and ranging (e.g., LIDAR) data. In some embodiments, three-dimensional image data comprises image data captured manually, image data captured by a drone, image data received from an image data database, image data extracted from a video of a real estate property, or image data acquired in any other appropriate way. In 702, one or more attributes of a database entry for a real estate property are determined from the image data. For example, tags are automatically determined in an image using image processing and the tags are used as attributes associated with a real estate property. In some embodiments, the real estate property comprises the real estate property associated with the image data. In 704, the database entry for the real estate property is updated. In various embodiments, updating a database entry for a real estate property comprises adding an attribute to the database entry, corroborating an attribute for the database entry, flagging an attribute of the database entry for review, deleting an attribute of the database entry, or updating the database entry in any other appropriate way. In 706, a display of the database entry for the real estate property is provided. In some embodiments, a display of the database entry is provided to the image uploader (e.g., to view the newly updated database). In some embodiments, a display of the database entry is provided to a real estate system user (e.g., in response to a search).

In some embodiments, an automatically identified tag in an image is used to update an attribute associated with a real estate property entry in a real estate database. In some embodiments, the automatically updated attribute (e.g., an added, deleted, flagged, modified attribute) is displayed in a manner to indicate that the automatically updated attribute has been automatically updated along with the type of update (e.g., an addition, a deletion, a flagging, a modification, etc.).

In some embodiments, it is determined whether the identified tag in an image is associated with an attribute that is not already in a real estate property entry in the real estate database, and, in the event that the attribute is not already in the real estate property entry in the real estate database, add the attribute in the real estate property entry and store an indication that the attribute was added automatically (e.g., auto added using image tag identification) in the database. In various embodiments, the automatically added attribute is then put in a queue to be corroborated by a user, administrator, an agent (e.g., an agent associated with the property), a quality control person, a crowd source (e.g., an outsource crowd sourcing—for example, Amazon Mechanical Turk), or any other appropriate corroborator. In some embodiments, once the entry is corroborated, store an indication that the attribute entry has been corroborated in the database.

In some embodiments, it is determined that the absence of a tag in an image is associated with an attribute that is already in a real estate property entry in the real estate database (e.g., no fireplace in the living room even though the database says there is a fireplace in the living room, etc.), the attribute is flagged in the real estate property entry and an indication is stored that the attribute is to be reviewed in the database. In various embodiments, the automatically flagged attribute is then put in a queue to be reviewed by a user, administrator, an agent (e.g., an agent associated with the property), a quality control person, a crowd source (e.g., an outsource crowd sourcing—for example, Amazon Mechanical Turk), or any other appropriate reviewer. In some embodiments, once the entry is reviewed, store an indication that the attribute entry has been reviewed in the database. In various embodiments, the review of the automatically flagged item results in the removal of the attribute (e.g., the fireplace or spa or pool is not present at the property), the leaving of the attribute (e.g., the fireplace or spa or pool is present at the property), or any other appropriate action.

In some embodiments, it is determined whether the identified tag in an image is associated with an attribute that is in a real estate property entry in the real estate database but in a slightly different form (e.g., blue cabinets instead of white cabinets in the kitchen), and, in the event that the attribute is already in the real estate property entry in the real estate database but in a different form, modify the attribute in the real estate property entry and store an indication that the attribute was modified automatically (e.g., auto modified using image tag identification) in the database. In various embodiments, the automatically modified attribute is then put in a queue to be corroborated by a user, administrator, an agent (e.g., an agent associated with the property), a quality control person, a crowd source (e.g., an outsource crowd sourcing—for example, Amazon Mechanical Turk), or any other appropriate corroborator. In some embodiments, once the entry is corroborated, store an indication that the attribute entry has been corroborated in the database.

Figure 8:
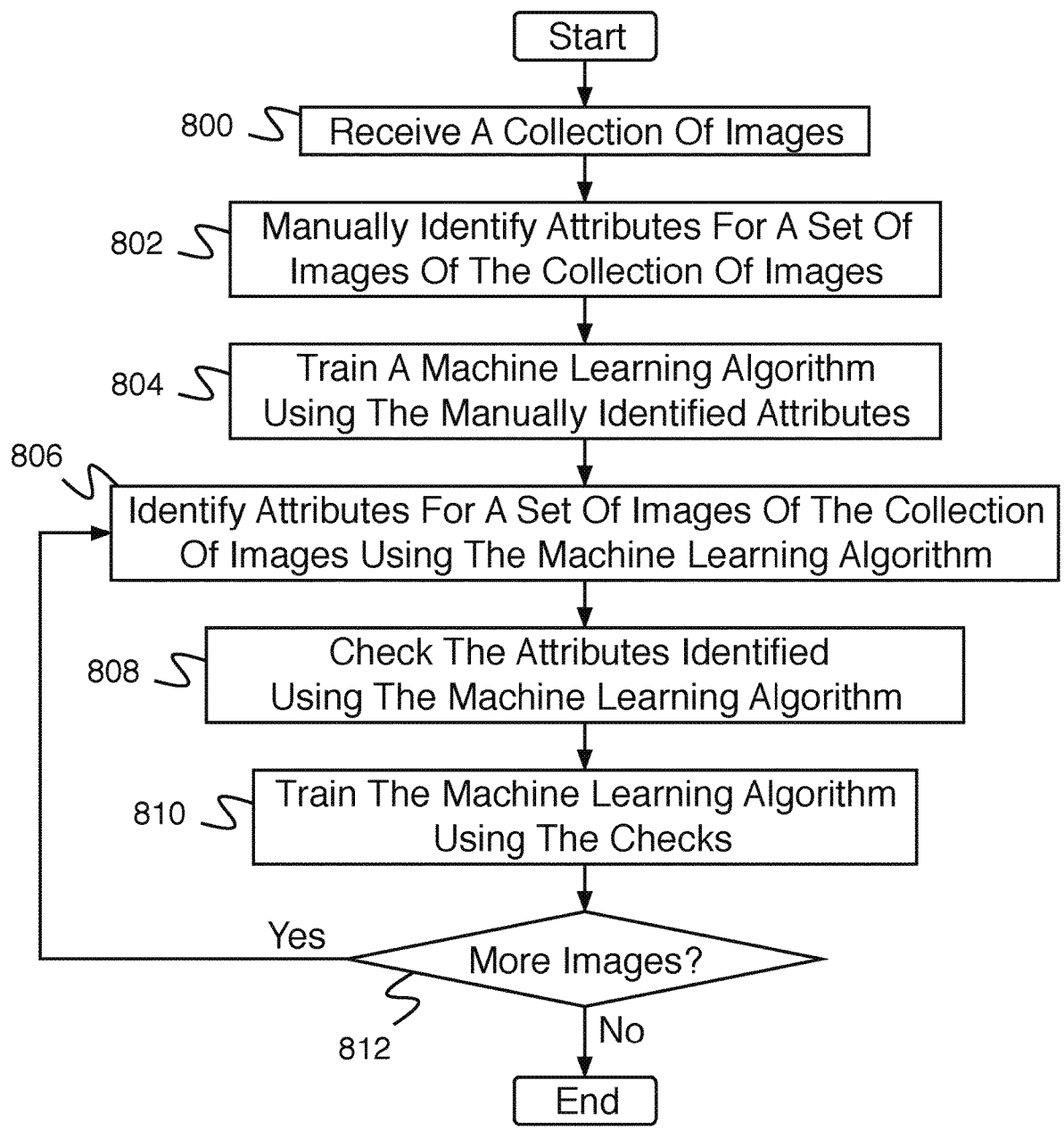
FIG. 8 is a flow diagram illustrating an embodiment of a process for training an algorithm.

In some embodiments, it is determined that the absence of a tag in an image is associated with an attribute that is already in a real estate property entry in the real estate database (e.g., no pool or garage associated with the real estate property, etc.), the attribute is deleted or hidden from view in the real estate property entry and an indication is stored that the deleted or hidden attribute is to be reviewed in the database. In various embodiments, the automatically hidden or deleted attribute is then put in a queue to be reviewed by a user, administrator, an agent (e.g., an agent associated with the property), a quality control person, a crowd source (e.g., an outsource crowd sourcing—for example, Amazon Mechanical Turk), or any other appropriate reviewer. In some embodiments, once the entry is reviewed, an indication is stored that the attribute entry has been reviewed in the database. In various embodiments, the review of the automatically deleted or hidden item results in the permanent removal of the attribute (e.g., the fireplace or spa or pool is not present at the property), the leaving of the attribute (e.g., the fireplace or spa or pool is present at the property), the reinstating of the attribute, the adding of a review indication, or any other appropriate action FIG. 8 is a flow diagram illustrating an embodiment of a process for training an algorithm. In some embodiments, the process of FIG. 8 comprises a process for training an algorithm to determine one or more attributes from image data. In some embodiments, after training using the process of FIG. 8, the algorithm is capable of implementing 702 of FIG. 7. In the example shown, in 800, a collection of images is received. In some embodiments, the collection of images comprises a collection of images to be tagged. In various embodiments, the collection of images comprises a collection of images uploaded by a real estate system user, obtained via a $3^{rd}$ party listing provider, or received from any other image sources. In 802, attributes for a set of images of the collection of images are manually identified. In some embodiments, manually identifying attributes comprises using a human to identify the attributes (e.g., providing images to a human and receiving attributes from the human for each image). In 804, a machine learning algorithm is trained using the manually identified attributes. In various embodiments, the machine learning algorithm comprises a Deep Learning, an Active Learning, or any other appropriate algorithm. In various embodiments, as part of training, the machine learning algorithm may convert images into a different set of representations (e.g., visual representations) including edge based features, color based features, high level abstractions (e.g., deep convolution networks), depth information, other real estate property attributes, real estate property description, user interaction logs, order of the images, or any other representations. In some embodiments, an image database that has associated metadata is used to train the machine learning algorithm (e.g., Imagenet). In 806, attributes for a set of images of the collection of images are identified using the machine learning algorithm. In 808, the attributes identified using the machine learning algorithm are checked. For example, checks are performed on a sample set of attributes assigned by the machine learning algorithm. In some embodiments, attributes identified using the machine learning algorithm are checked using image tag confirmation screen 400 of FIG. 4. In 810, the machine learning algorithm is trained using the checks. For example, the machine language algorithm is trained using the checks on sampled data. In some embodiments, active learning is used. In various embodiments, the algorithm uses image segmentation, object detection and localization, texture classification using the representation extracted from the image, or any other appropriate algorithm or algorithm component In 812, it is determined if there are more images (e.g., more images in the collection of images that have not already had tags identified). In the event it is determined that there are more images, control passes to 806. In the event that it is determined that there are not more images, the process ends.

Figure 9:
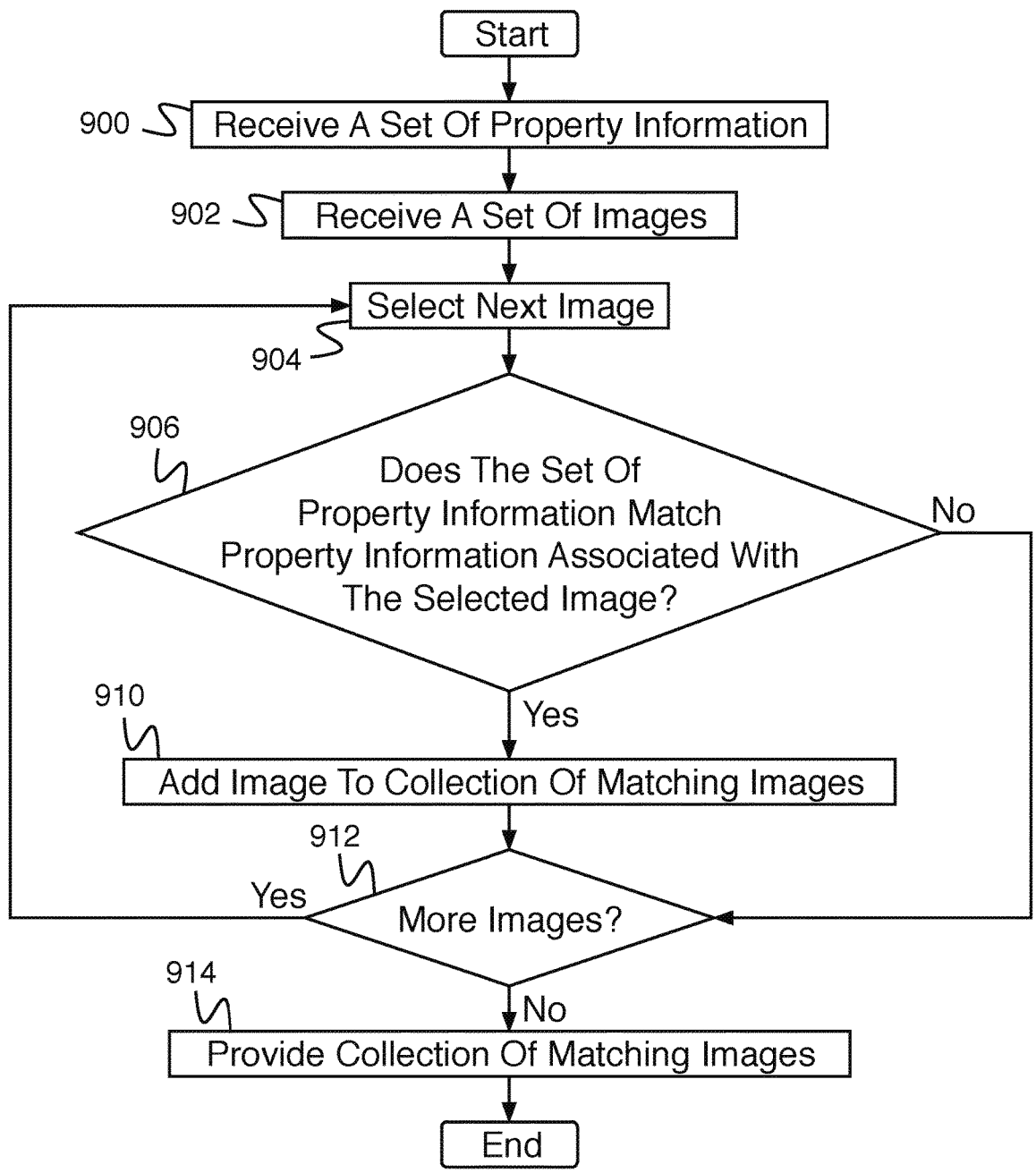
FIG. 9 is a flow diagram illustrating an embodiment of a process for searching for images.

FIG. 9 is a flow diagram illustrating an embodiment of a process for searching for images. In some embodiments, the process of FIG. 9 is used by a real estate server (e.g., real estate server 106 of FIG. 1) for searching for images matching set of property information. In 900, a set of property information is received. For example, a set of search criteria is received. In some embodiments, a set of property information is received using real estate property search window 500 of FIG. 5. In 902, a set of images is received. For example, a library of images in a real estate database is received. In 904, the next image (e.g., the next image of the set of images) is selected. In some embodiments, the next image comprises the first image. In 906, it is determined whether the set of property information matches property information associated with the selected image. For example, the property information associated with the selected image comprises tags or attributes associated with a property. In the event it is determined that the set of property information does not match information associated with the selected image, control passes to 912. In the event it is determined that the set of property information matches information associated with the selected image, control passes to 910. In 910, the image is added to a collection of matching images. In 912, it is determined whether there are more images (e.g., more images of the set of images). In the event it is determined that there are more images, control passes to 904. In the event it is determined that there are not more images, control passes to 914. In 914, the collection of matching images is provided.

In some embodiments, a user is enabled to search a real estate database. The results of the search by attribute (e.g., a search for houses in a city, with an attribute in a room, in a price range, with a number of a certain type or room, etc.) is able to be presented to a user and the associated full real estate entry is able to be accessed from the search results so that the user can view the full details of the property identified using the search. Search results can be stored so that the full set of results and their associated full database entries are able to be explored and viewed by a user.

Figure 10:
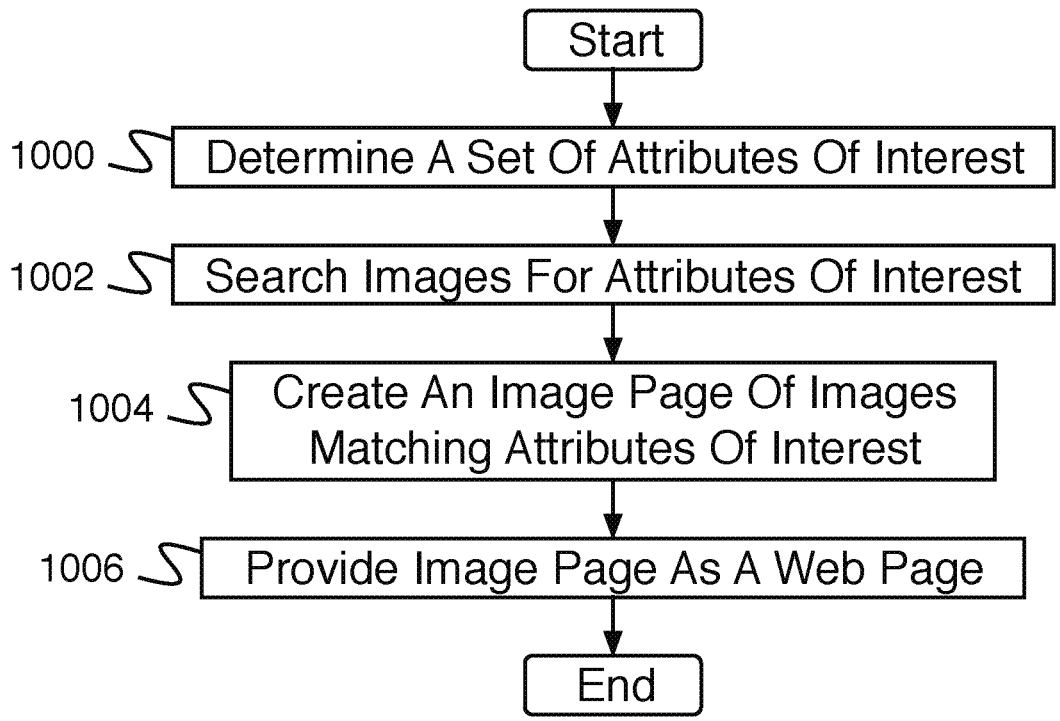
FIG. 10 is a flow diagram illustrating an embodiment of a process for creating an image page.

FIG. 10 is a flow diagram illustrating an embodiment of a process for creating an image page. In some embodiments, the image page comprises image page 600 of FIG. 6. In the example shown, in 1000, a set of attributes of interest are determined. In various embodiments, a set of attributes of interest are chosen by determining commonly searched attributes, attributes commonly applied to properties, unusual attributes, unusual combinations of attributes, attributes commonly applied to expensive properties, or are determined in any other appropriate way. In 1002, images are searched for the attributes of interest. In some embodiments, images are searched for the attributes of interest using the process of FIG. 9. In 1004, an image page is created of images matching the attributes of interest. In some embodiments, creating an image page of images matching the attributes of interest comprises inserting the images found using the search of 1002 into an image page. In various embodiments, creating an image page of images matching the attributes of interest additionally comprises inserting formatting information, image attribute information, property information of the property associated with each image, or any other appropriate image into the image page. In 1006, the image page is provided as a web page. In some embodiments, providing the image page as a web page comprises formatting the image page (e.g., in HTML format). In some embodiments, providing the image page as a web page comprises uploading the image page (e.g., to a web server). In various embodiments, an image page includes user selected organization, filtering, sizing, ranking and searching of images, or any other appropriate user customization. In some embodiments, a user feedback about an image of the images on an image page is obtained (e.g., likes, dislikes, sharing, etc.).

In various embodiments, use cases for the image tags that have been used to update attributes of a real estate database entry include:

Visual Search or Similarity search (e.g., a search where the query is an image)—for example, a search is initiated using an image (e.g., an image taken by a user device); the system determines tags for the image or a visual representation(s) for similarity, the tags and/or the visual representation(s) are used to initiate a search, results returned based on matches to tags or attributes associated with properties in the database, images and/or their associated properties are provided to the initiator of the search using the image. In some embodiments, the user of the system can query the database to search for a property or an image using a photo (e.g., a photo captured by a device). For example, scenarios using a photo query include: scenario 1) consumer is visiting an open house, likes the kitchen, consumer uses an app on their mobile device to capture an image of the kitchen, which is then sent to a server for processing, the photo is analyzed and a result set of homes is returned with similar kitchens to the consumer; and scenario 2) same as scenario #1, however focused on external features of the house—for example a photo of the front of the home and we return result set of homes with similar architectural style. In some embodiments, a user of the system indicates a region of interest on the image (e.g., indicating a bounding box around an object) to make a query to the database. For example, user is specifically interested in the "antler chandelier" and indicates his intention by providing a bounding box around the object in the image. The image and the bounding box are then sent to a server for processing, the photo is analyzed and a result set of homes containing an instance of "antler chandelier" is returned.

Neighborhood attributes—for example, deriving attributes about the neighborhood using all possible images (e.g., green index, presence of water bodies, etc.) of properties in a neighborhood. The attributes can be listed to characterize the neighborhood (e.g., 20 large trees, lake nearby, large yards, etc.). Or for another example, an analysis is performed on the attributes that are gathered to provide a summary or a characterization of the neighborhood (e.g., rural, urban, suburban, historic, luxury, fixer-upper, etc.)

Property classification—for example, a particular property's images are analyzed to determine associated tags and the tags and other property information are analyzed to determine a list or characterization of the particular property (e.g., luxury, fixer-upper, empty lot, etc.).

Popularity or attractiveness score—for example, the image is analyzed for its tags and these tags and other property information are then compared to groups associated with popularity and/or attractiveness and scored. The score provides an estimate as to how good an image is or how popular it might be.

Ad targeting based on the content of the image—for example, the tags associated with an image are analyzed to determine an appropriate ad to display as associated with the tags (e.g., a luxury kitchen tag would get a high-end kitchen appliance ad, etc.).

Fraud detection using the image tags—for example, absence of a picture tagged as a bathroom for each of the reported number of bathrooms for a property is flagged as potentially having an incorrect claim for that number of bathrooms. As another example, in the event that there are two identical or similar images associated with more than one property, the properties are flagged as potentially fraudulent.

Listing de-duplication using the image tags—for example, listings are compared based on the set of tags associated with the images associated with the listing. In the event that the tag set is highly correlated (e.g., 98% the same) or that the visual representations are highly correlated, indicate that the two listings may be duplicates.

Image level attributes can be combined to derive higher order attributes at the image or property level—for example, stucco exterior and Saltillo tile entry associates a property with a Mediterranean home designation or attribute.

Although the foregoing embodiments have been described in some detail for purposes of clarity of understanding, the invention is not limited to the details provided. There are many alternative ways of implementing the invention. The disclosed embodiments are illustrative and not restrictive.

We claim:

1. A system for updating-a real estate database using images comprising a computer-readable medium having contents stored thereon that when executed by one or more processors of the system cause the system to:
store, at a real estate property database, information about a set of real estate properties and a set of attributes associated with each real estate property of the set of real estate properties;
receive image data of a real estate property in the set of real estate properties;
determine, via a machine learning model at the one or more processors, from the image data, one or more first tags associated with the real estate property;
identify, via the real estate property database, a set of attributes associated with the real estate property;
generate, using the one or more first tags and the set of attributes associated with the real estate property, at least one new attribute for the real estate property, wherein the at least one new attribute is not part of the identified set of attributes associated with the real estate property;
update a database entry in the real estate property database by adding (i) the at least one new attribute for the real estate property to the set of attributes associated with the real estate property and (ii) the one or more first tags associated with the real estate property to the image data of the real estate property, the update of the database entry causing the real estate property database to be updated;
receive, at a user interface, selection of a set of search criteria to search for real estate properties; and
identify, at the one or more processors, a subset of real estate properties in the set of real estate properties, from the updated real estate property database, by comparing the set of search criteria with: (1) the set of attributes associated with each real estate property, and (2) one or more second tags associated with image data of each real estate property, wherein the set of attributes associated with each real estate property comprises the set of attributes subsequent to the updating of the real estate database.

2. The system of claim 1, wherein the contents when executed by the one or more processors of the system further cause the system to:

display, at the user interface, one or more images and information associated with the identified subset of real estate properties.

3. The system of claim 2, wherein the identified subset of real estate properties are ranked in an order corresponding to a degree of similarity between the set of search criteria and the one or more second tags associated with each real estate property of the set of real estate properties.

4. The system of claim 2, wherein the identified subset of real estate properties are grouped based on the one or more second tags associated with each real estate property of the set of real estate properties.

5. The system of claim 1, wherein the contents when executed by the one or more processors of the system further cause the system to:
    display, at the user interface, the set of search criteria to search for real estate properties,
        wherein the set of search criteria comprises at least one tag among the determined one or more first tags associated with the real estate property.

6. The system of claim 1, wherein the image data comprises:
    a photo,
    three-dimensional image data,
    LIDAR data,
    or any combination thereof.

7. The system of claim 1, wherein an attribute of the set of attributes, the at least one new attribute, a tag of the one or more first or second tags, or any combination thereof comprises one or more of the following:
    a neighborhood attribute,
    number of bathrooms,
    number of bedrooms,
    total number of rooms
    a room type attribute,
    a house type attribute,
    a view type attribute,
    a room attribute,
    a location attribute,
    property tree count,
    home square footage,
    number of floors,
    presence/absence of a deck,
    presence/absence of a hot tub,
    presence/absence of a dock to a lake,
    presence/absence of a pool,
    presence/absence of a garage,
    presence/absence of a fixture,
    driveway material,
    floor material,
    type of flooring,
    cabinet material,
    objects in a room,
    material of objects in a room,
    color of objects in a room,
    property slope,
    presence/absence of a fireplace, or
    presence/absence of a wine cellar.

8. The system of claim 1, wherein the set of search criteria to search for real estate properties comprises an image.

9. The system of claim 1, wherein the contents when executed by the one or more processors of the system further cause the system to:
    display, at the user interface, visual information based on at least a portion of the updated database entry.

10. A system for creating image webpages of real estate properties comprising a computer-readable medium having contents stored thereon that when executed by one or more processors of the system cause the system to:
    store, at a real estate property database, information about a set of real estate properties and a set of attributes associated with each real estate property of the set of real estate properties;
    receive image data of a real estate property in the set of real estate properties;
    determine, via a machine learning model at the one or more processors, from the image data, one or more first tags associated with the real estate property;
    identify, via the real estate property database, a set of attributes associated with the real estate property;
    generate, using the one or more first tags and the set of attributes associated with the real estate property, at least one new attribute for the real estate property, wherein the at least one new attribute is not part of the identified set of attributes associated with the real estate property;
    update a database entry in the real estate property database by adding (i) the at least one new attribute for the real estate property to the set of attributes associated with the real estate property and (ii) the one or more first tags associated with the real estate property to the image data of the real estate property, the update of the database entry causing the real estate property database to be updated;
    receive, at a user interface, a set of attributes of interest;
    identify, at the one or more processors, one or more images of the set of real estate properties, from the updated real estate property database, by comparing the set of attributes of interest with: (1) the set of attributes associated with each real estate property, and (2) one or more second tags associated with image data of each real estate property, wherein the set of attributes associated with each real estate property comprises the set of attributes subsequent to the updating of the real estate database; and
    generate, at the least one processor, one or more image pages comprising the identified one or more images.

11. The system of claim 10, wherein the set of attributes of interest is selected by determining one or more of the following: commonly searched attributes, attributes commonly applied to properties, unusual attributes, unusual combinations of attributes, or attributes commonly applied to expensive properties.

12. The system of claim 10, wherein the contents when executed by the one or more processors of the system further cause the system to:
    display, at the user interface, the one or more image pages comprising the identified one or more images.

13. The system of claim 10, wherein the one or more image pages further comprises:
    formatting information,
    image attribute information,
    property information of a real estate property associated with an identified matching image,
    or any combination thereof.

14. The system of claim 10, wherein the contents when executed by the one or more processors of the system further cause the system to:
    upload the generated one or more images pages to at least one web server.

15. The system of claim 10, wherein the identified one or more images in a generated image page are organized based on a user selected organization criteria.

16. The system of claim 10, wherein the contents when executed by the one or more processors of the system further cause the system to:
  filter the one or more images in a generated image page based on user selected filtering criteria.

17. The system of claim 10, wherein the contents when executed by the one or more processors of the system further cause the system to:
  receive user feedback about at least one of the one or more images in a generated image page.

\* \* \* \* \*